(12) United States Patent
Sun et al.

(10) Patent No.: US 6,716,022 B2
(45) Date of Patent: *Apr. 6, 2004

(54) BIODEGRADABLE AND EDIBLE FEED PACKAGING MATERIALS

(75) Inventors: Xiuzhi S. Sun, Manhattan, KS (US); Greggory S. Karr, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/395,322

(22) Filed: Mar. 24, 2003

(65) Prior Publication Data

US 2003/0185928 A1 Oct. 2, 2003

Related U.S. Application Data

(63) Continuation of application No. 09/813,777, filed on Mar. 21, 2001, now Pat. No. 6,561,787, which is a continuation-in-part of application No. 09/408,373, filed on Sep. 29, 1999, now Pat. No. 6,337,097.

(51) Int. Cl.[7] .......................... B29C 43/36; A21C 11/00
(52) U.S. Cl. ................ 425/412; 425/410; 425/174.8 R; 425/422; 249/112
(58) Field of Search ................................ 425/412, 410, 425/174.8 R, 422, 398, 262, 263; 249/112, 78; 426/512

(56) References Cited

U.S. PATENT DOCUMENTS

| 1,321,125 A | 11/1919 | Pfanstiehl .................... 419/42 |
| 3,149,374 A | 9/1964 | Wagner ............... 425/174.8 R |
| 3,232,246 A | * | 2/1966 | Nishkian .................... 426/512 |
| 3,719,479 A | 3/1973 | Flanagan .................... 264/111 |
| 4,104,348 A | 8/1978 | Munk et al. ................. 264/212 |
| 4,337,710 A | 7/1982 | Haataja et al. ............. 108/53.3 |
| 4,440,708 A | 4/1984 | Haataja et al. .............. 264/109 |
| 4,544,342 A | 10/1985 | Werz et al. .................. 425/410 |
| 4,559,195 A | 12/1985 | Heggenstaller ............. 264/120 |
| 4,798,694 A | 1/1989 | Sugata et al. ................. 264/60 |
| 4,867,670 A | 9/1989 | Munk .......................... 425/347 |
| 4,931,007 A | 6/1990 | Gold et al. ................. 425/438 |
| 5,078,938 A | 1/1992 | Munk et al. ................. 264/109 |
| 5,160,368 A | 11/1992 | Begovich .................... 426/138 |
| 5,213,821 A | 5/1993 | Munk .......................... 425/472 |
| 5,246,721 A | * | 9/1993 | Kerkonian .................. 425/412 |
| 5,295,804 A | * | 3/1994 | Dinnan ....................... 425/398 |
| 5,308,663 A | 5/1994 | Nakagawa et al. ......... 428/34.2 |
| 5,476,617 A | 12/1995 | English et al. ................ 264/37 |
| 5,688,448 A | 11/1997 | Shutov et al. ................ 264/54 |
| 5,800,756 A | 9/1998 | Andersen et al. ........... 264/129 |
| 5,810,961 A | 9/1998 | Andersen et al. ........... 156/324 |
| 5,972,262 A | 10/1999 | Huber ........................ 425/381 |

* cited by examiner

Primary Examiner—Robert Davis
Assistant Examiner—Thu Khanh T. Nguyen
(74) Attorney, Agent, or Firm—Hovey Williams LLP

(57) ABSTRACT

Molding apparatus (10) is provided which allows use of a particulate non-liquid molding material (121) to produce a variety of articles, such as frustoconical barrel segments (122). The apparatus (10) includes a female mold segment (18) including generally annular inner and outer sidewalls (70, 76) and a complemental male mold section (20) having an annular sidewall unit (30). In use, a molding material (121) is placed between the sidewalls (70, 76) and the section (20) is shifted so that it telescopes within the section (18); this compresses the material (121) to a desired final shape, which is then hardened to yield the final product (122). An optional wear insert (26) can be used with female mold section (18), which can be replaced as needed and assists in cleaning of the apparatus (10).

47 Claims, 5 Drawing Sheets

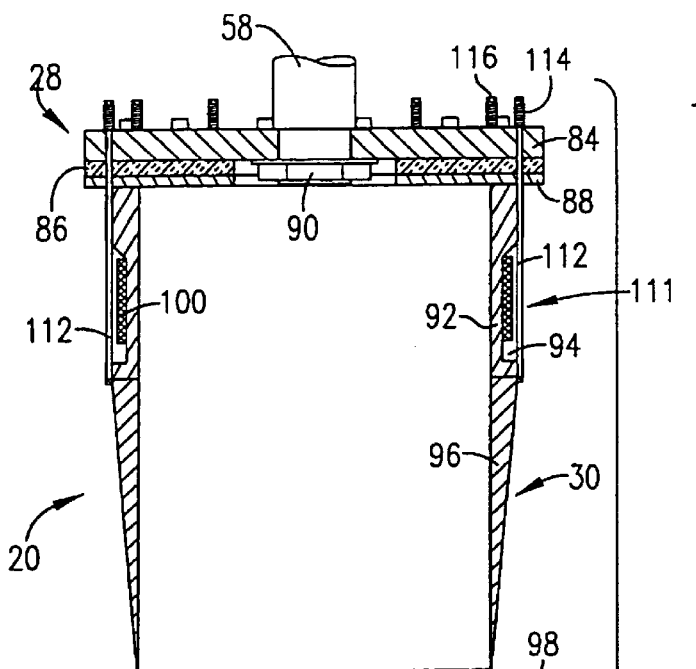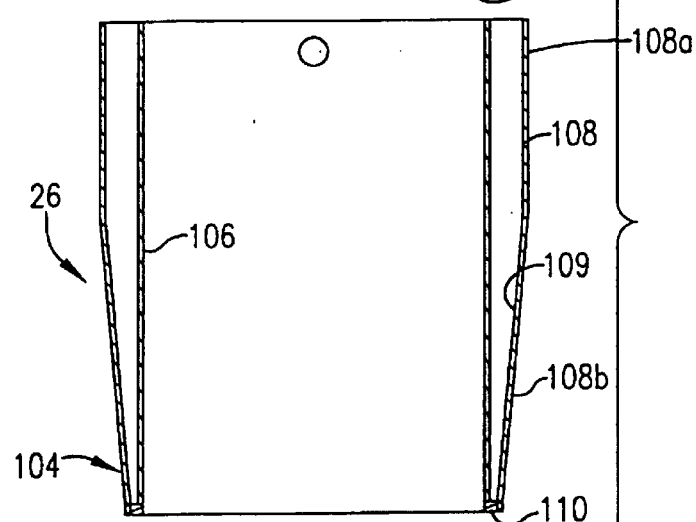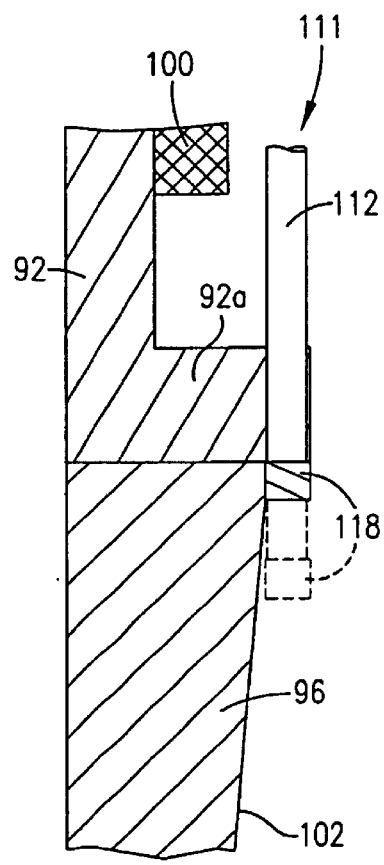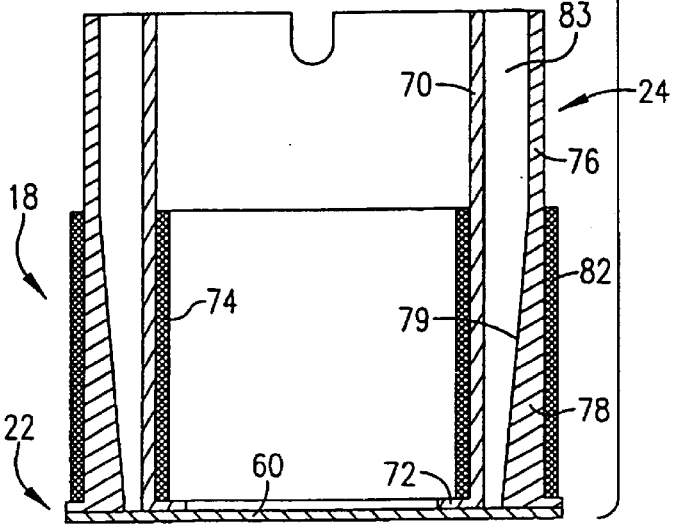
FIG. 2.
FIG. 3.

FIG. 6.
FIG. 7.
FIG. 8.
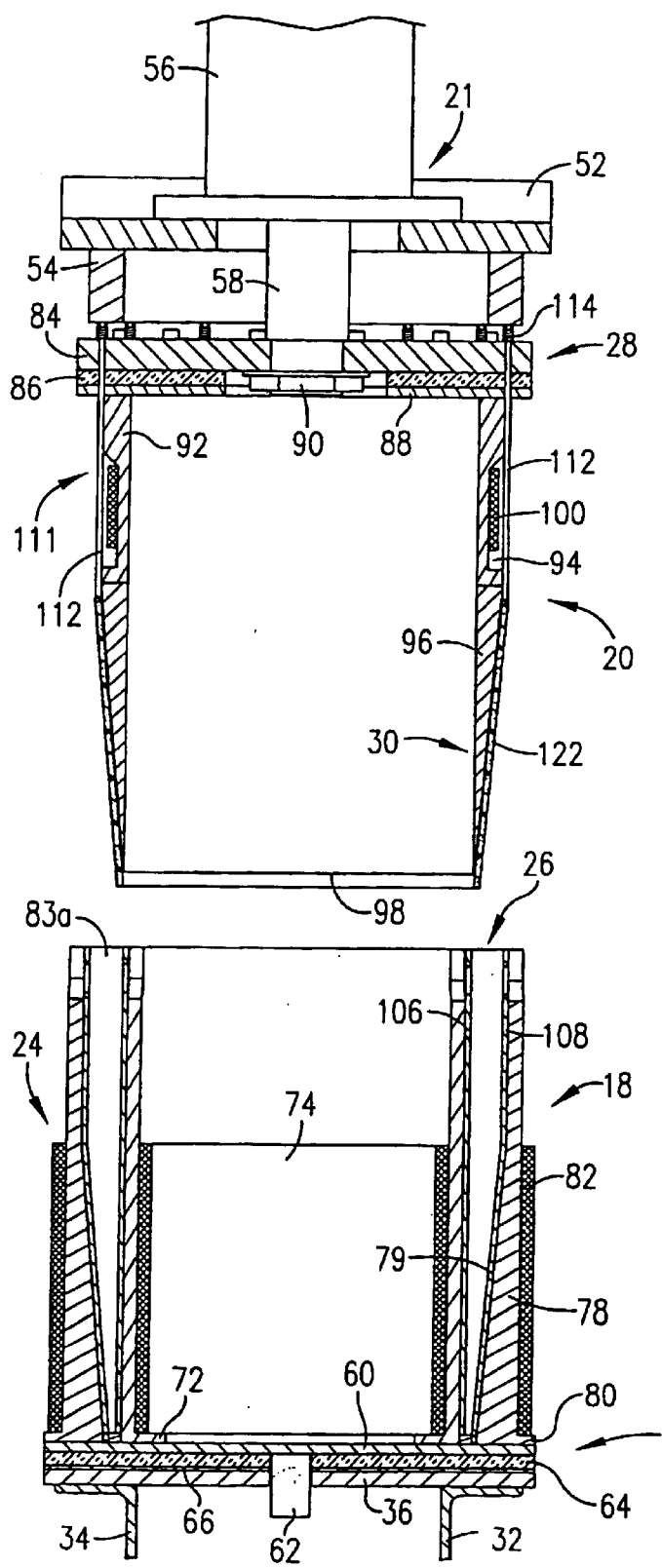
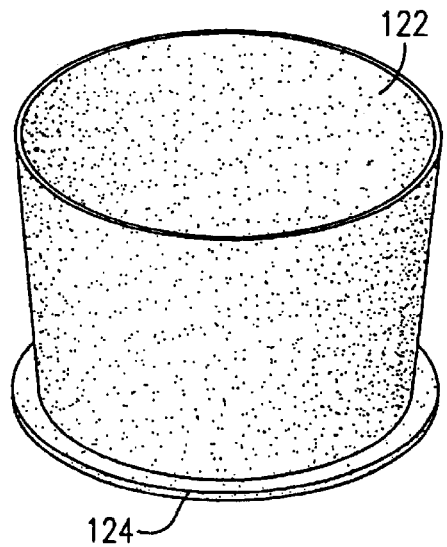
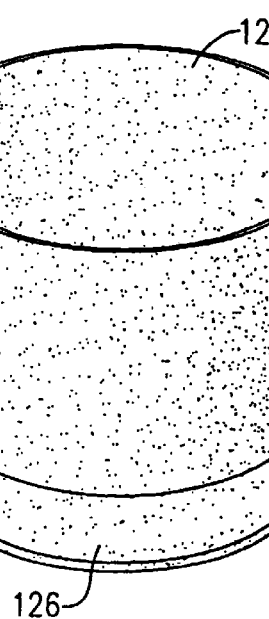

BIODEGRADABLE AND EDIBLE FEED PACKAGING MATERIALS

RELATED APPLICATIONS

This application is a continuation of Ser. No. 09/813,777 filed Mar. 21, 2001 now U.S. Pat. No. 6,561,787 which is a continuation-in-part of application Ser. No. 09/408,373 filed Sep. 29, 1999 now U.S. Pat. No. 6,337,097.

FEDERALLY SPONSORED RESEARCH/DEVELOPMENT PROGRAM

This invention was made with government support under Grant 99-33610-7442 awarded by the United States Department of Agriculture. The government has certain rights in the invention.

BACKGROUND OF THE INVENTION

1. Field of the Invention

The present invention is broadly concerned with biodegradable and edible packaging composites or containers comprising self-sustaining bodies and formed from a mixture comprising a non-petroleum based, biodegradable adhesive and a quantity of fiber. More particularly, the containers comprise a fiber derived from a fiber source selected from the group consisting of straw (e.g., wheat, rice, barley), corn stalks, sorghum stalks, soybean hulls, peanut hulls or any other fibers derived from grain milling by-products), and mixtures thereof. The adhesive can be protein-based or starch-based, and is preferably formed by modifying a protein, starch, or protein-rich flour with a modifier comprising alkaline materials and/or modifiers having particular functional groups. The resulting mixture has a low moisture content and is molded at high temperatures and pressures to yield a final container having high compressive strengths.

In another aspect of the invention, molding apparatus and corresponding methods are provided for forming complex shapes using composite-type molding materials which are non-flowable under pressure, such as polymer-impregnating cellulosic fibers. The preferred equipment includes generally annular male and female mold sections which present cooperating adjacent surfaces when telescoped together for compression of the non-flowable molding materials so that the materials assume a desired shape for molding. In preferred forms, the mold sections are heated to accelerate curing and hardening of the molding materials.

2. Description of the Prior Art

Livestock gel blocks are currently utilized for supplementing the diets of sheep, horses, and cattle in both feedlot and open grazing conditions. The blocks are formed of gels which are flowable at a temperature of about 80° C. These gels are poured into a container and become rigid upon cooling. The gel blocks have "cold flow properties" meaning that, although they appear to be a solid, the blocks will not retain their shape when subjected to stress (such as from the weight of other blocks or gravity). As a result, the gel blocks are not free-standing and must be in a container at all times. The gels turn into a thick syrup upon absorbing moisture from the air. This syrup is then consumed by the livestock.

Currently available containers for use with gel blocks include half steel drums, plastic tubs, and paper or cardboard containers. Each of these containers has undesirable properties. For example, the steel drums must be either thrown away or recycled after use. Recycling is generally preferred in order to minimize the quantity of waste in landfills and other disposal sites. However, recycling involves additional labor and expense as the drums must be collected and transported back to the feed manufacturer and then reconditioned (i.e., reshaped, cleaned, and sterilized) by the manufacturer before reusing the drum. Likewise, plastic tubs can be discarded or recycled but must undergo the same labor and expense involved in recycling steel drums. Furthermore, the plastic tubs result in the generation of plastic waste which presents a disposal problem for the consumer as well as a liability problem for the manufacturer.

Paper and cardboard containers have been attempted commercially as an alternative to plastic or steel. However, paper and cardboard containers do not perform adequately. One problem with paper and cardboard containers is that they are permeable to moisture at room conditions, thus allowing moisture to contact the gel. This causes the gel to turn into a syrup prematurely which then seeps through the container, making the products difficult to ship and store. Furthermore, these paper and cardboard containers do not easily biodegrade, leaving waste at the feeding site. Finally, the livestock may consume portions of these paper or cardboard containers, presenting a possible danger to the livestock if the paper or card-board is not processed following FDA standards.

U.S. Pat. No. 5,160,368 to Begovich discloses a biodegradable package for fast food comprising a body which is molded from a composition consisting essentially of an admixture of biodegradable natural materials comprising low-protein flour (i.e., about 10–15% by weight protein in the flour) or meal from edible gramineous plants (e.g., corn or sorghum), crushed hay of gramineous plants (e.g., wheat, sorghum, corn, or corncob leaves), a preservative, and a plasticizing agent. However, the '368 package has a high moisture content prior to molding (about 50% by weight moisture), thus resulting in a container that often cracks when molded at the high temperatures and pressures necessary to obtain a strong container. Furthermore, the '368 patent fails to use a strong adhesive which results in a package having inadequate mechanical properties for use in packaging of livestock feed gel blocks (which often weigh 250 lbs. each) and other applications which require a strong container.

Particle boards and similar composites are typically formed from wood chips, sawdust and other wood waste products by mixing such cellulosic materials with a synthetic resin binder and pressing the mixture between flat platens under high pressures and elevated temperatures. While this method is useful for making flat panels, it is not suitable for production of non-planar shapes such as frustoconical half-barrel sections or other complex shapes.

Injection molding processes have long been used to form non-planar objects of varied shapes. However, injection molding is only applicable when the starting molding material is at least somewhat flowable under heat and pressure conditions. Thus, injection molding is inapplicable for use with relatively light, particulate, substantially dry starting materials such as those used to form particle board or the like.

There is a need for biodegradable and edible packaging containers which do not contain cracks or other defects and which have strong mechanical properties, allowing the container to be subjected to stress with little risk of failing. Also, improved molding apparatus and methods which can make use of relatively inexpensive dry particulate starting materials while having the capability of producing non-planar complex objects would represent a significant advance in the art.

SUMMARY OF THE INVENTION

The instant invention provides biodegradable and edible composites having high compressive strengths. Broadly, the composites are in the form of a self-sustaining body formed from a mixture comprising a non-petroleum based, biodegradable adhesive and a quantity of fiber. These composites can be used as containers for livestock gel blocks as well as other applications such as flower and plant containers.

In more detail, the fiber utilized in the inventive composites is derived from a fiber source selected from the group consisting of straw (including wheat, rice, and barley), corn stalks, sorghum stalks, soybean hulls, peanut hulls, and mixtures thereof. While most non-petroleum based, biodegradable adhesives which are capable of forming the high strength composites of the invention are suitable, it is preferred that the adhesive be formed by modifying a starch (e.g., cereal starch and legume starch), protein, protein-rich flour (i.e., soy flour or other flour having at least about 25% by weight protein, and preferably at least about 40% by weight protein), or mixtures thereof with a modifier selected from the group consisting of:

(1) alkaline materials (such as NaOH);
(2) saturated and unsaturated alkali metal $C_8$–$C_{22}$ (and preferably $C_{10}$–$C_{18}$) sulfate and sulfonate salts;
(3) compounds having the formula I:

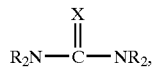

wherein each R is individually selected from the group consisting of H and $C_1$–$C_4$ saturated and unsaturated groups, and X is selected from the group consisting of O, NH, and S; and (4) mixture of (1), (2), and (3).

The $C_1$–$C_4$ saturated and unsaturated groups refer to alkyl groups (both straight and branched chain) and unsaturated refers to alkenyl and alkynyl groups (both straight and branched chain). Preferred compounds having the formula I are urea and guanidine hydrochloride. When urea is the modifier, the protein, starch, or protein-rich flour is preferably essentially free of urease, having less than about 10 activity units of urease. Alternately, a urease inhibitor can be added to the protein, starch, or protein-rich flour.

Saturated alkali metal $C_8$–$C_{22}$ sulfate and sulfonate salts include all alkali metal alkyl (such as octyl and dodecyl) $C_8$–$C_{22}$ sulfate and sulfonate salts. Unsaturated alkali metal $C_8$–$C_{22}$ sulfate and sulfonate salts include all alkali metal alkenyl (such as decenyl and octadecenyl) $C_8$–$C_{22}$ sulfate and sulfonate salts and all alkali metal alkynyl (such as octynyl and tetradecynyl) $C_8$–$C_{22}$ sulfate and sulfonate salts. Two particularly preferred modifiers in this class are sodium dodecyl sulfate (SDS) and sodium dodecylbenzene sulfonate (SDBS).

The adhesives are prepared by simply forming an aqueous slurry or dispersion of modifier and starch, protein, or protein-rich flour. This modifier slurry is mixed for about 1–400 minutes at a temperature of from about 15–70° C. Preferably, the forming and mixing of the dispersion takes place under ambient temperature and pressure conditions.

The resulting adhesive is then mixed with a quantity of fiber. Preferably the particle size of the fiber is such that less than about 10% of the particles have a particle size of less than about 678 μm. The fiber and non-petroleum based adhesive should be utilized in appropriate quantities so that the mixture and final composite or container comprises from about 5–20% by weight adhesive solids (i.e., all solid components in the adhesive on a dry basis), and preferably from about 10–16.7% by weight adhesive solids, based upon the total weight of the mixture or final composite taken as 100% by weight. The mixture and final composite or container preferably comprises at least about 70% by weight fiber solids, and preferably from about 80–95% by weight fiber solids, based upon the total weight of the mixture or final composite taken as 100% by weight. The ratio of fiber solids to adhesive solids should be from about 2.5:1 to about 20:1, preferably from about 4:1 to about 15:1, and more preferably from about 5:1 to about 9:1.

The formed mixture is then dried to a moisture content of less than about 20% by weight, preferably from about 5–15% by weight, and more preferably about 11–13% by weight, based upon the total weight of the mixture taken as 100% by weight. It is preferred that no preservatives be added to this mixture so that the final composite is essentially free of preservatives. In one embodiment, the mixture consists essentially of a non-petroleum based, biodegradable adhesive and a quantity of fiber.

When a protein or protein-rich flour is modified to form the biodegradable adhesives utilized in preparing the composites of the invention, the protein or protein-rich flour should be included in sufficient quantities so that the concentration of protein in the mixture (i.e., the fiber mixed with the aqueous dispersion after drying) is at least about 5% by weight, preferably at least about 7% by weight, and more preferably at least about 9% by weight, based upon the total weight of the mixture taken as 100% by weight. Suitable proteins for forming the adhesives include those selected from the group consisting of soybean protein, wheat protein, corn protein, sorghum protein, and mixtures thereof.

The dried mixture is then molded into a package having the preferred shape for the particular application. Molding is carried out by subjecting the shaped mixture to molding temperatures of from about 150–500° F., and preferably from about 200–350° F., and molding pressures of from about 150–600 psi, and preferably from about 220–450 psi. The molding process should be carried out for a time period of from about 1–20 minutes, and preferably from about 3–8 minutes. Molding can be carried out on any conventional molding presses known in the art, so long as the press is able to accommodate the foregoing temperature and pressure conditions. Furthermore, the mixture can be molded into virtually any shape, depending on the particular application. Preferred shapes for use in livestock feed supplements include box-shaped and half-barrel-shaped containers.

The final, molded composite or container should have a moisture content of less than about 10% by weight, and preferably less than about 5% by weight, based upon the total weight of the composite or container taken as 100% by weight. The final composite or container should have an ASTM D1037-93 compressive strength of at least about 5 MPa, preferably at least about 8 MPa, and more preferably at least about 10 MPa. Furthermore, the biodegradable composite or container should be essentially decomposable within about 1 year of being placed in the environment, depending upon its exposure to moisture and/or light. Finally, a moisture barrier (such as an FDA food grade wax) can be applied to the surfaces of the formed composite so as to minimize moisture absorption by the composite.

The present invention also provides molding apparatus broadly including generally annular male and female mold sections together with a support assembly for supporting the male section in general concentric alignment with the female section. Preferably, the female mold section includes a base and a generally annular sidewall assembly coupled to the base which presents substantially concentric, generally annular inner and outer sidewalls defining therebetween a space for receiving a molding material. The male mold section includes a generally annular sidewall unit adapted to telescope within the female mold sidewall assembly. The mold support assembly includes a drive operable to selectively move at least one the male and female mold sections to effect telescoping thereof. Respective portions of the sidewall unit and at least one of the inner and outer sidewalls of the female sidewall assembly are arranged to cooperatively compress the molding material during telescoping of the mold sections, in order that the molding material assumes a desired shape. Preferably, the male and female mold sections have wall portions which are cooperatively tapered, usually at an angle of taper of from 2–20°, most usually about 5°.

Preferably, a heating assembly is provided to heat the molding material during the molding operation to accelerate curing and hardening thereof. This heating assembly may include resistance heating elements operably coupled with the female mold sidewall assembly and the male mold sidewall unit. Alternately, other types of heaters could be employed, e.g., oil, water or steam.

Although not essential, in most cases the male mold section is situated above the female mold section and in substantial concentric alignment therewith. The mold drive preferably includes a hydraulic ram coupled with the male mold section for forcibly telescoping the male mold section at least partially into the female mold sidewall assembly. In this type of molding apparatus, a lower frame is provided beneath the female mold section and allows selective movement of the latter between a molding location beneath the male mold section and a load/unload location shifted away from the molding location.

In further preferred aspects of the invention, the female mold section receives an annular liner which accommodates the molding material and also receives the male mold section. In addition, a molded article detach device is operable coupled with the male mold section so that, upon retraction of the male mold section after a molding operation, the molded article can be easily detached from the male mold section.

In operation, a quantity of molding material is placed with the female mold section and the mold drive is operated to cause relative movement between the male and female mold sections so that the sidewall unit of the male section telescopes into the sidewall assembly of the female section; during such movement the molding material is compressed between respective portions of the sidewall unit and at least one of the inner and outer sidewalls of the female mold section. At this point, a predetermined time-temperature molding cycle is carried out to harden and cure the compressed molding material, whereupon the mold sections are separated and the molded article is recovered.

While in preferred embodiments the mold sections are substantially annular in configuration, the invention is not so limited. That is, polygonal (e.g., rectangular or hexagonal) in cross-section mold walls can be provided, so as to produce similarly configured final molded articles.

The molded articles of the invention find utility in a number of contexts. For example, low-moisture type livestock feed supplements are not free standing but must be contained in some type of package. Currently utilized feed supplement containers include half steel drums, plastic tubs and paper board or fiber board containers. However, the molded products of the invention, preferably made using cellulosic materials, are fully biodegradable or edible and thus present no recovery or disposal problems after usage. Another use would be in one-way "disappearing" consumable containers used by the military to transport material to remote locations. As these supplies are used, the containers could be left behind for decomposition or consumption by wildlife in a relatively short time. This would eliminate the burden of transporting empty containers while also ameliorating the negative environmental impact of remote military operations. Finally, molded products made using the apparatus of the invention can serve as compostable barrels for yard waste and plantable tree containers.

BRIEF DESCRIPTION OF THE DRAWINGS

FIG. 2 is an exploded view of the male and female molding sections, with an intermediate, optionally usable liner for the female molding section;

FIG. 3 is a greatly enlarged, fragmentary vertical sectional view illustrating the construction of the molded article detach unit forming a part of the preferred embodiment;

FIG. 6 is a vertical sectional view similar to that of FIG. 4 and showing the male mold section retracted from the female mold section during dislodgement of a molded article from the male mold section;

FIG. 7 is a perspective view of a complete barrel segment made using the molding apparatus of the invention;

FIG. 8 is an exploded perspective view of another type of barrel section made using the apparatus of the invention.

DETAILED DESCRIPTION OF THE PREFERRED EMBODIMENTS

Figure 1:
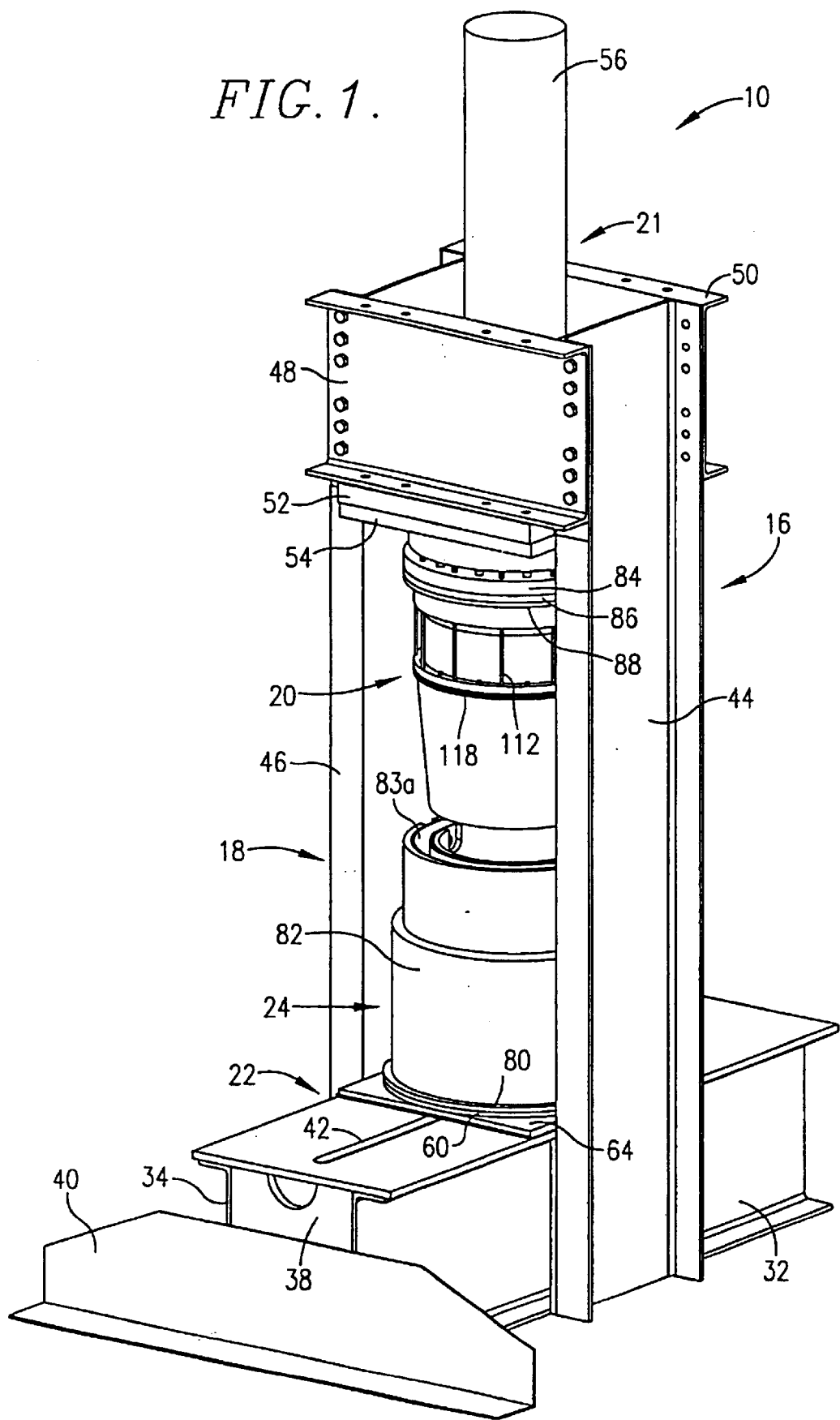
FIG. 1 is a perspective view of a preferred molding apparatus in accordance with the invention, shown with the male mold section positioned above the female mold section, prior to a molding operation.

Turning now to the drawings, and particularly FIG. 1, a molding apparatus in accordance with the invention broadly includes a frame assembly 12 made up of a lower box frame 14 and an upper frame 16, female mold section 18 and cooperating male mold section 20; as shown, the mold sections 18 and 20 are supported by frame assembly 12, the latter also having a hydraulic ram drive 21 connected to male mold section 20. The female mold section 18 generally has a base 22, and upstanding annular sidewall assembly 24, and an optional insert 26 (see FIG. 2). Similarly, the male mold section 20 has an upper plate 28 as well as a depending, generally annular sidewall unit 30 secured thereto.

In more detail, the lower frame 14 includes a pair of upright, laterally spaced apart channel sidewalls 32 and 34, with a top plate 36 and a front plate 38 welded to the sidewalls 32,34 as shown. A laterally extending front stabilizer 40 is also welded to the forward ends of the sidewalls 32 and 34. The top plate 36 has an elongated, fore and aft extending slot 42 therethrough, which is important for purposes to be made clear.

Figure 4:
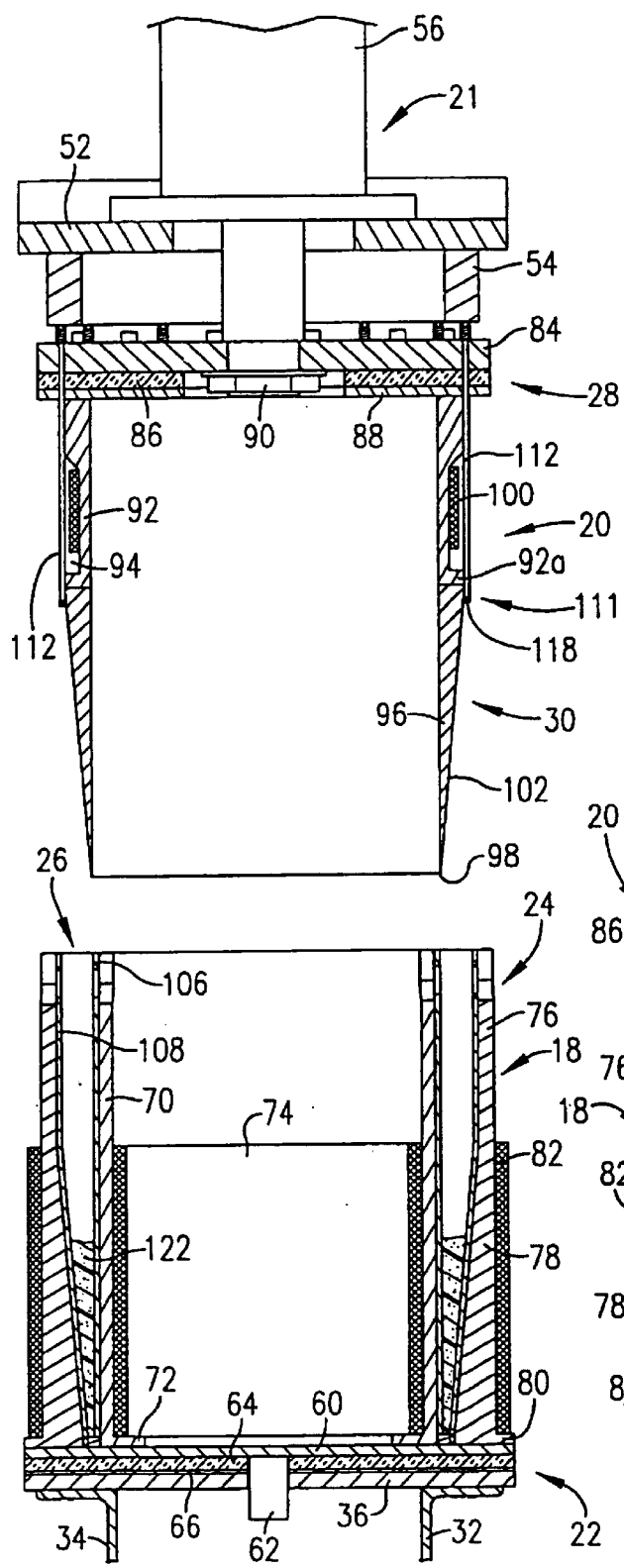
FIG. 4 is a fragmentary vertical sectional view of the preferred molding apparatus, shown with a charge of molding material within the female mold section and prior to the molding operation.

The upper frame 16 is made up of a pair of elongated, upright side channels 44 and 46 welded to the corresponding channel sidewalls 32 and 34 and extending vertically upwardly therefrom. Crosspiece channels 48 and 50 are bolted to and extend between the upper ends of the side channels 44 and 46. As best seen in FIG. 4, the upper frame 16 supports the drive 21, and for this purpose includes a centrally apertured mounting plate 52 operably secured by welding to the channels 44–50. The plate 52 also includes a depending, annular engagement wall 54.

Again referring to FIG. 4, it will be seen that the ram drive 21 is of conventional design and includes an upwardly extending cylinder 56 secured to the upper face of plate 52, with an extensible ram 58 extending downwardly through the central opening of the plate 52.

Figure 5:
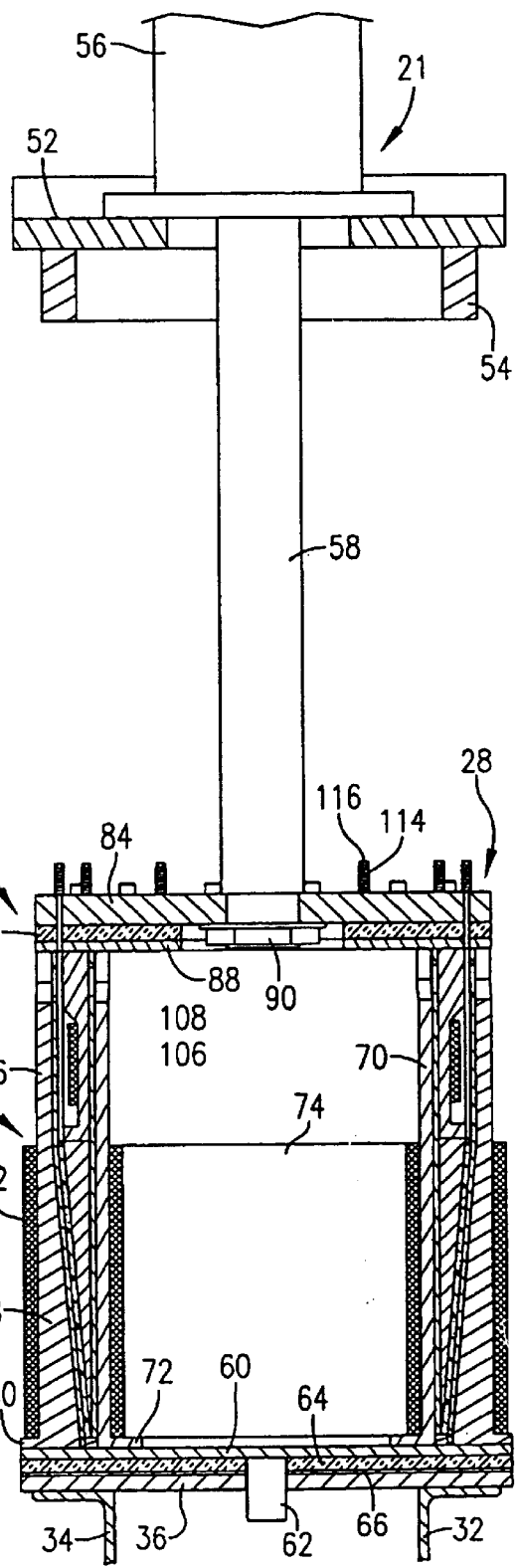
FIG. 5 is a fragmentary vertical sectional view similar to that of FIG. 4, but depicting the male mold section fully inserted within the female mold section during the molding procedure.

The female mold section 18 includes a circular metallic base plate 60 supporting the upstanding annular sidewall assembly 24 and also having a downwardly extending guide pin 62 secured to the underside thereof. In preferred forms, an insulative slider plate 64 and a thin, metallic wear plate 66 are also affixed to the bottom of plate 60. Referring to FIGS. 4 and 5, note that guide pin 62 extends downwardly from base plate 60 and is received within slot 42 of frame top plate 36.

The annular sidewall assembly 24 includes an inner, substantially circular in cross-section sidewall 70 having a lowermost, annular, inwardly extending connection foot 72. An inboard electric resistance heater 74 is disposed adjacent the inner surface of sidewall 70 and extends upwardly from the foot 72 through a portion of the height of the sidewall 70. In addition, the overall assembly 24 has an outer annular sidewall 76 which is substantially concentric with the sidewall 70. The sidewall 76 has lower segment 78 presenting an inwardly tapered inner surface 79 (that is, tapered towards the central axis of the mold section 18), with an outwardly extending connection foot 80. An outboard electric resistance heater 82 is secured to the outer surface of segment 78 and extends upwardly from the foot 80 as shown. Thus, the inner and outer sidewalls 70, 76 cooperatively define a space 83 therebetween (see FIG. 2).

The upper plate 28 of male mold section 20 includes an annular primary plate 84, with an insulative secondary plate 86 and a lower plate 88 secured to the underside thereof. The threaded lower end of ram 58 extends through the central opening provided through primary plate 84, and is attached to the latter by means of nut 90. The sidewall unit 30 is welded to the bottom all of plate 88 and depends therefrom. Preferably, the unit 30 is made up of an upper annular segment 92 provided with a lower connection foot 92a and an exterior, circumferentially extending recess 94; a lower segment 96 is connected to foot 92a and presents a circular leading margin 98. An electrical resistance heater 100 is mounted within recess 94 as shown. Also, the outer surface 102 of lower segment 96 is inwardly tapered.

Optional insert 26 is in the form of a metallic body made up of any inner, substantially circular in cross-section wall component 106 and an outer wall component 108. The components 106, 108 adjoin at the lower ends thereof via foot 110 connected to component 106. As best illustrated in FIG. 2, the wall component 108 includes an upper segment 108a which is substantially parallel with inner component 106, and an inwardly tapered lower segment 108b presenting an inner tapered surface 109. The insert 26 is designed to be complementally received within space 83, and to this end the inner surface of component 106 mates with the outer surface of sidewall 70, while the outer surface of wall component 108 likewise mates with the inner surface of sidewall 76. In this orientation (see FIG. 6), the inner and outer sidewalls of the assembly 24 are defined by the wall components 106,108, and the latter cooperatively define a space 83a therebetween. Of course, if insert 26 is not used, then the inner and outer sidewalls of the assembly 24 are made up of the sidewalls 70, 76.

Although not essential, the male mold section 20 is preferably provided with an article detach device 111. The device 111 includes a plurality of circumferentially spaced pushrods 112 extending downwardly through upper plate 28. The upper ends of the pushrods 112 above plate 28 are each equipped with a coil spring 114 surmounted by a connection nut 116. Referring to FIG. 3, it will be seen that the lower ends of the pushrods 112 are shiftably guided by a passage through openings in foot 92a and are secured to annular ring or fixture 118.

The use of apparatus 10 is illustrated in FIGS. 4–6 for the production of substantially frustoconical barrel segments 122 illustrated in FIGS. 7 and 8. In this description, it is assumed that use is made of the optional insert 26 within female mold section 18, and that the heaters 74, 82 and 100 are operating to heat the walls of the mold segments to a desired molding temperature.

In the first step of the process, the female mold section 18 is shifted away from male mold section 20, simply by pushing the female mold section along top plate 36; this movement is of course guided by the pin 62 within slot 42. At this point the space 83a defined by insert 26 is at least partially filled with a molding material 121, usually up to the region of the straight-walled portion of the insert. A commonly used molding material comprises cellulosic fibers coated with an adhesive or polymer matrix (e.g., at least about 50% by weight fibrous material and less than about 25% by weight adhesive or matrix). Next, the filled female mold section 18 is shifted back to the use position directly beneath male mold section 20, that is, to the position shown in FIG. 1 between side channels 44 and 46 so that the mold sections 18, 20 are in general concentric alignment.

Once the segment 18 is properly aligned in the use position, the ram drive 21 is actuated to shift male mold section 20 downwardly so that unit 30 telescopes into the space 83 (if no insert is used) and space 83a (if insert 26 is employed) to assume a molding position depicted in FIG. 5. During such downward movement, the molding material 121 is progressively compressed between the complementally tapered surfaces 102,109 of the segment 96 and insert 26, respectively. In the final molding position, the surfaces 102,109 are substantially parallel and the material 121 is highly compressed therebetween. Sufficient pressure, temperature and residence time are used so that the compressed body of material between the surfaces 102, 109 is hardened and cured. The magnitude of force required to close the mold parts depends chiefly upon the formulation of material 121 and the desired density of the finished molded part.

After the desired time-temperature molding cycle is complete, the drive 21 is reversed so as to elevate the male mold section 20 and remove it from the male mold section 18. As this occurs, the now-molded barrel segment 122 adheres either to lower segment 96 of sidewall unit 30 (FIG. 6) or to surface 109 (or both). As the male molding segment 20 clears the female segment 18, the latter is first pushed away from the use position to allow access to the molded segment 122. During continued elevation of the male mold section 20, the device 111 comes into play in order to detach the molded segment 122 from unit 30. Specifically, as the plate 28 is shifted upwardly, the nuts 116 come into contact with the underside of engagement wall 54. This serves to shift the pushrods 112 downwardly against the bias of the springs 114, causing the ring 118 to engage the upper margin of the molded segment 122 and thereby detach it from the male mold segment. The operator should of course be ready to "catch" the segment 122 as it is detached, to avoid breakage thereof. This can be done manually or through use of a scissor table or raisable platform (not shown).

The frustoconical segment 122 is typically provided with a bottom wall so as to make a usable container. As illustrated in FIG. 7, the segment 122 may be attached to a bottom wall 124 provided with a complemental groove in the upper face thereof. Alternately, a bottom wall 126 may be employed which has a tapered periphery allowing it to be interconnected entirely within the base of the segment 122.

Although in the preferred embodiment use is made of smooth parallel molding surfaces 102 and 109 in order to provide the segment 122, the invention is not so limited. For example, one or both of the surfaces 102, 109 may have surface designs thereon, such as advertising indicia or ribbing. Also, the defining surfaces need not be circular in cross-section; non-circular polygonal in cross-section wall surfaces (which are generally annular) can be used. While the surfaces 102, 109 are in the embodiment shown tapered only to a minor extent, greater or less tapers, or no taper at all, are within the ambit of the invention.

The following examples describe illustrative processes using the preferred molding apparatus and compositions in accordance with the invention. Of course, nothing in these examples should be taken as a limitation upon the overall scope of the invention.

EXAMPLE 1

The molding material used in this example was made up of 73% by weight straw, 15% by weight defatted soy flour and 12% by weight water. The straw was first ground using a hammermill with a 0.2 inch hole size screen to give a ground product ranging in size from dust to 1.5 inch in length (average particle size 1–10 mm). The ground straw was then coated with a defatted soy-water slurry and dried.

2.7 kg of the molding material was loaded into the space 83 of mold section 18 and evenly distributed around the mold circumference. The mold sections were heated to 175° F., whereupon the mold sections were telescoped together using 50 tons of compressive force. During this time, mold heating was continued to a set temperature of 300° F. The mold sections were held together for 5 minutes at this set temperature. Next, the mold drive was reversed with the molded article adhering to the male mold section. The article was then removed from the mold. The specific gravity of the barrel wall was between 0.8 and 0.9.

Three barrel sections made as set forth above were tested for compression strength between two parallel plates and a crosshead speed of 0.1 inch/minute. The maximum loads for the articles were 4,168, 4,459 and 5,155 pounds, respectively.

In actual commercial practice, it is anticipated that use will be made of the inserts 26 in the molding apparatus. In particular, the mold sections 18 and 20 will be preheated to 330° F. Molding material (4.1 kg) will be loaded into the space 83a of an insert and evenly distributed therein. This loaded insert is placed into the lower mold section 18, after the latter is moved away from upper mold section 20. Thereupon, the lower mold section is moved back beneath the upper mold section, and the drive 21 is used to force the upper mold section into the space 83a. Such motion is stopped when the bottom surface of plate 88 contacts the top edge of sidewalls 70, 76. The press is held in position for a press time of around three minutes. At this point, the drive 21 is reversed and the molded article 22 and insert 26 is lifted out of the lower mold section 18. Once the bottom of the insert 26 clears the top of the lower section 18, the latter is slid out along groove 42. As this occurs, a raisable table is slid under the upper mold section 20. When this table is properly positioned, the drive further elevates the section 20 until the push rods 112 come into contact with wall 54, which pushes ring 118 downward to thereby strip part 122 and insert 26 off of the male mold section.

At this point, the table is lowered and moved away from the molding apparatus, allowing the molded article 122 to be removed from the insert 26. This is accomplished by lifting the wall 106 causing the lower foot 110 to engage the bottom edge of the article 122 and detaching the latter from the insert.

EXAMPLE 2

1. Preparation of Sample Boards

In this example, 38 g of soybean flour was mixed with 200 ml of distilled water until the flour was uniformly dispersed in the water. Next, about 2 g of NaOH was added to the resulting water/flour mixture, and the adhesive was allowed to develop for a few minutes. About 300 g of ground wheat straw (obtained from Natural Fiber Board, Minneapolis, Kans.) was uniformly mixed with the developed soy flour-based adhesive, followed by drying of the resulting mixture. The final mixture had a soy flour content of about 10% by weight, based upon the total weight of the mixture taken as 100% by weight. Next, about 120 g of the dried mixture was compressivelymolded into 6" by 6" flat boards at 388 psi pressure and 140° C. for about 6 minutes. The above procedure was repeated with wheat gluten proteins. Finally, a biodegradable/edible wax was applied to the composite boards to form a moisture barrier around the boards. No solvents or thinners were necessary as the melted wax was in the form of a liquid-like solution.

2. Quality Evaluation of Boards a. Mechanical Property Tests

The boards prepared in Part 1 above were subjected to several tests to determine their various mechanical properties. The boards were cut into samples for the mechanical property testing using an Instron 1120 with crosshead speed of 2.54 mm/min. A 3-point bending test was performed on the flat board specimens to obtain several properties, including the modulus of rupture (MOR) and the modulus of elasticity (MOE). All specimen boards were pre-conditioned (maintained at 65% RH, 72–73° F. for at least two days) before the respective tests and the ASTM testing standard methods (ASTM D1037-93 for compressive strength and tensile strength of the boards) were followed. Each test was replicated at least three times.

b. Stability Test

A humidity incubation test was carried out on the boards prepared in Part 1 in order to determine the environmental stability of the boards. The board samples were preconditioned in 30% relative humidity (RH) at 27° C. for 1 week, followed by incubation in 90% RH for 1 week, after which the tests were conducted. Linear expansion, thickness swell, and weight gain were the properties measured on the straw board samples. Two replicates of the test were carried out.

3. Results and Discussion

Table 1 shows the maximum rupture strength and elasticity of the straw board specimens with different protein concentrations. The strengths of each of the composite samples were quite similar. The wheat gluten from Midwest Grain gave a slightly higher MOE than the gluten from Heartland Wheat Growers (Russell, Kans.).

TABLE 1

Bending strength of the straw fiber-based composites with natural binders.

| Sample | MOR (MPa) max. ± 3 | MOE (MPa) max. ± 460 |
|---|---|---|
| 14% soy flour | 8 | 1274 |
| 10% soy flour | 7 | 1179 |
| 10% gluten (Heartland Wheat Growers) | 6 | 1045 |
| 10% MW gluten (Midwest Grain) | 8 | 1560 |

Table 2 sets forth the dimension stability of the straw board specimens. After 1 week at 90% RH at 27° C., the swelling in thickness ranged from about 27% to about 40% for the three different composites. The swelling of the soy flour composites and gluten composites were similar to one another, and the 14% soy flour composites had the least swelling in thickness. All three composites had similar linear expansion and weight gain.

TABLE 2

Dimension stability of the straw fiber-based composite with natural binders after 1 week incubation at 90% RH and 27° C.

| Samples | Thickness swell % | Linear expansion % | Weight gain % |
|---|---|---|---|
| 14% soy flour | 28.09 | 0.93 | 15.4 |
| 10% soy flour | 40.04 | 1.11 | 15.78 |
| 10% gluten | 37.29 | 1.06 | 15.00 |

EXAMPLE 3

1. Effect of Molding Pressure on Mechanical Properties of Samples

In this example, boards were prepared as described in Example 2 except that the mixture was dried to a 10% by weight moisture content prior to pressing. Each board was pressed at a molding temperature of 250° F., but the molding pressures and times were varied to determine the effect of molding pressures and times on the compressive strengths and tensile strengths of the boards. Those results are reported in Tables 3 and 4.

TABLE 3

Tensile strength of the composites with 10% moisture content as affected by molding pressure at 250° F.

| | Pressure (psi) | 56 | 167 | 220 | 330 | 440 |
|---|---|---|---|---|---|---|
| Tensile Strength (MPa) | For 4 minutes | 0.5 | 1.6 | 3.4 | 4.7 | 6.8 |
| | For 8 minutes | 0.5 | 1.8 | 4.0 | 7.1 | 7.6 |

TABLE 4

Compressive strength of the composites with 10% moisture content as affected by molding pressure at 250° F.

| | Pressure (psi) | 56 | 167 | 220 | 330 | 440 |
|---|---|---|---|---|---|---|
| Compressive Strength (MPa) | For 4 minutes | 1.6 | 3.6 | 13.6 | 14 | 18 |
| | For 8 minutes | 1.0 | 5.0 | 10.4 | 13.6 | 28.5 |

2. Effects of Moisture Content on Mechanical Properties of Samples

In this example, boards were prepared as described in Example 2 except the drying times of the boards were varied so as to yield boards of varying moisture contents. The boards were then molded at various molding temperatures and pressures to determine the effect of moisture content, molding pressure, and molding temperature on the mechanical properties of the boards. These results are reported in Tables 5 and 6.

TABLE 5

Tensile strength of the composite as affected by moisture content and molding pressure.

| Moisture content % | 10 | 15 | 20 | 30 | 38 |
|---|---|---|---|---|---|
| Tensile Strength (MPa) | | | | | |
| at 220° F. for 4 min: | | | | | |
| at molding pressure 220 psi | — | — | — | — | — |
| at 250° F. for 8 min: | | | | | |
| at molding pressure 220 psi | 4.0 | — | crack | — | — |
| at molding pressure 55 psi | — | — | — | — | — |
| at 320° F. for 4 min: | | | | | |
| at molding pressure 220 psi | — | — | crack | — | — |

TABLE 6

Compressive strength of the composite as affected by moisture content and molding pressure.

| Moisture content % | 10 | 15 | 20 | 30 | 38 |
|---|---|---|---|---|---|
| Compressive Strength (MPa) | | | | | |
| at 220° F. for 4 min: | | | | | |
| at molding pressure 220 psi | — | 0.2 | 0.3 | — | — |
| at 250° F. for 8 min: | | | | | |
| at molding pressure 220 psi | 10.4 | — | crack | — | — |
| at molding pressure 55 psi | — | — | — | 2.3 | — |
| at 320° F. for 4 min: | | | | | |
| at molding pressure 220 psi | — | crack | — | — | — |

3. Discussion

The mechanical properties were significantly affected by the processing conditions and moisture content of the board. Referring to Tables 4 and 6, at 10% moisture content, 220 psi molding pressure, and 250° F. molding temperature, the compressive strength of the board was about 13.6 MPa (when pressed for 4 minutes) and about 10.4 MPa (when pressed for 8 minutes). However, when a board having a 20% moisture content was pressed at 220° F. and 220 psi, for 8 minutes, the board cracked (Table 6). Furthermore, at higher moisture contents of 30% by weight, the molding pressure had to be reduced to 55 psi to obtain a board that did not crack. However, the compressive strength of this board was only 2.3 MPa (Table 6), which is insufficient for feed packaging applications.

The interactions between the moisture content and molding pressures and temperatures are very important. At high moisture contents and high molding temperatures and pressures, the samples exhibited defects (such as cracks) due to the fast water transfer rate from the center to the surface. At low molding pressures and temperatures, however, the compressive strength of the samples was too low to be suitable for packaging applications.

EXAMPLE 4

Figure 9:
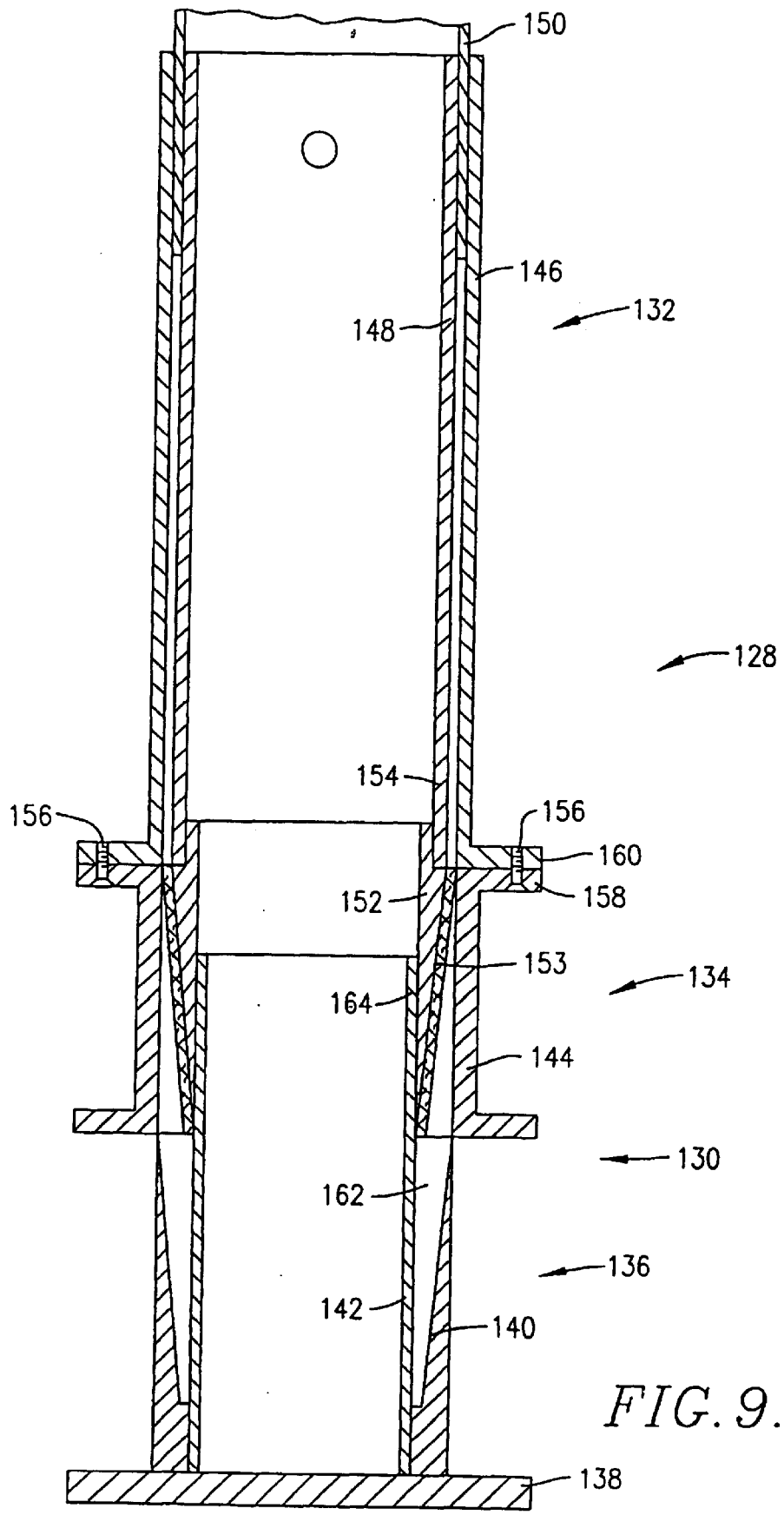
FIG. 9 is a vertical sectional view illustrating the laboratory molding apparatus utilized to form the biodegradable and edible barrel in Example 4 from the mixtures of the invention.

A biodegradable and edible mixture comprising fiber and adhesive was prepared as described in Part 1 of Example 2 above except that, rather than compressing the mixture into a board, it was compressed into the shape of a barrel without a bottom using a laboratory scale mold prepared particularly for this purpose. Referring to FIG. 9, the mold apparatus 128 includes a stationary lower cylindrical female assembly 130 and an upper cylindrical male assembly 132. Assembly 130 includes upper stationary cylinder section 134 and lower stationary cylinder section 136. Section 136 has a flat base 138, a cylindrical tapered mold surface 140, and an inside guide cylinder 142. Section 134 includes a sidewall 144. Mold surface 140 acts as a guide for sidewall 144 of section 134 as it is lowered to base 138 during pressing.

Assembly 132 includes an outer stationary cylinder 146, an inner cylinder 148 positioned within cylinder 146, and a center ram cylinder 150 positioned between cylinders 146, 148. Cylinders 148, 150 are shiftable relative to cylinder 146. Cylinder 148 includes a tapered cylindrical mold portion 152 secured to end 154 of cylinder 148. It will be observed that the portion 152 presents a tapered surface 153 complemental with opposed surface 140. During use, cylinder 146 is secured to sidewall 144 of section 134 by way of screws 156 which pass through screw openings in respective flanges 158, 160 of sidewall 144 and cylinder 146.

In forming the barrel used in this example, cylinder 146 was separated from sections 134, 136. Next, 360 grams of the mixture was placed within an opening 162 created by mold surface 140 and inside guide cylinder 142, so that the mixture filled the opening 162 to a level approximately adjacent the top end 164 of cylinder 142. Cylinder 148 was then placed within apparatus 128 so that mold portion 152 was positioned between cylinder 142 and sidewall 144 and between cylinder 142 and surface 140. Stationary outside cylinder 146 was then secured to sidewall 144 by way of screws 156, and the center ram cylinder 150 was inserted between inside cylinder 148 and outside cylinder 146. A hydraulic press (not shown) was operatively coupled to cylinder 150, and cylinder 150 was subjected to pressure by the press. When the top portion of cylinder 150 was approximately adjacent the top portion of cylinder 148, both cylinders 148, 150 were subjected to heat (about 120° C.) and pressure (about 300–350 psi) by the press for approximately 10 minutes. The apparatus 128 was then disassembled, and the formed barrel sidewall 166 was removed from the mold portion 152.

The bottom portion (not shown) of the barrel was formed by pressing the same mixture into a flat, circular panel. The press conditions were 290° F. and 333 psi for 6 minutes. The panel thickness was from about 0.375 to 0.5 inches, with the panel having a density similar to that of the barrel. A recessed area was machined into the panel around its perimeter. The recessed area had the same diameter and width as the bottom edge of sidewall 166 (i.e., at the smaller end of the barrel). This bottom portion was then secured to sidewall 166 by placing sidewall 166 within the recessed area on the bottom portion.

The formed lab-scale barrel specimens were then tested for their compressive strength. The testing procedures followed were the same as for the boards described in Example 2. These test results were used to estimate the maximum load strength of the barrel when produced at commercial scale. Three replicates of these tests were conducted.

The physical dimensions of the barrel are set forth in Table 7. Various tests were conducted on the barrel. The maximum compressive strength of the barrel was about 283 kg (623 lbs.) with a displacement of 1.6. Based on this result, the projected maximum compression load of a commercial size barrel would be approximately 990 kg (2100 lbs.). In animal supplement gel applications, this would allow the barrels to be stacked five high with a 50% safety factor, which is strong enough to support the static load from the gel in four containers. While the molding time of the lab-scaled barrel was about 10 minutes, use of commercial molding equipment such as that depicted in FIGS. 1–6 permits reduced molding times (e.g., about 3–5 minutes).

TABLE 7

CYLINDER COMPRESSION RESULTS

| Barrel Dimensions | |
|---|---|
| Top Diameter | 6.0 inches |
| Height | 6.0 inches |
| Wall Thickness | 0.25 inches |
| Degree of Taper | 5° |
| Density | 0.0284 lb/in$^3$ |
| | 0.786 g/cm$^3$ |
| Circumference | 18.8 inches |
| Test Conditions: | |
| Testing Machine | Instron 1120 |
| Test Type | Compression |
| Crosshead Speed | 2.54 mm/min |

EXAMPLE 5

1. Preparation of Sample Boards

In this example, tests were conducted to determine the effect of the moisture content of the soy/straw mixture just prior to compressing of the mixture. The three moisture levels tested were 7% by weight, 10% by weight, and 12% by weight, based upon the total weight of the mixture taken as 100% by weight. In this procedure, 2.7 g of NaOH was dissolved in 600 g of distilled water. Next, 136.4 g of soy flour (obtained from Cargill, Cedar Rapids, Iowa) was mixed with the NaOH solution until the flour was uniformly dispersed in the solution. The slurry was then blended with 1000 g of ground wheat straw in order to achieve a uniform coating of the slurry over the straw. The resulting mixture was then dried to the desired moisture content. Finally, about 120 g of the dried mixture was compressively molded into 6" by 6" flat boards at a molding pressure of 333 psi and a molding temperature of 390° F. for about 5 minutes. The resultant boards were about 0.25' thick.

2. Quality Evaluation of Sample Boards

Mechanical property tests were conducted on the boards as set forth in Part 2(a) of Example 2. The thickness swell of the sample boards was determined following the stability test set forth in Part 2(b) of Example 2.

3. Results and Discussion

Table 8 sets forth the results from these tests. As the data clearly indicates, the moisture content of the soy straw just prior to compressive molding of the mixture has a significant effect on the composite's physical properties. These results, along with the results of Example 3, indicate that there is an optimum moisture content which maximizes the composite's physical properties. At high moisture contents, the composite will crack when the molding pressure is removed. As the moisture content decreases below the optimum level, the composite's physical properties will likewise decrease, as appears to have been the case in Example 2.

TABLE 8

Bending properties and dimensional stability of the soy/straw composites with varying moisture contents

| Sample Moisture Content[a] | MOR (MPa) max ± 2 | MOE (MPa) max ± 400 | Thickness Swell (%) max ± 4 |
|---|---|---|---|
| 7% | 13.7 | 2190 | 35.6 |
| 10% | 20.1 | 3370 | 22.5 |
| 12% | 21.3 | 3110 | 8.5 |

[a]In percent by weight, based upon the total weight of the mixture taken as 100% by weight.

EXAMPLE 6

1. Preparation of Sample Boards

In this Example, three soy/straw composite formulas having varying amounts of NaOH modifier were tested. The amounts of NaOH modifier utilized were 0.0 g, 5.3 g, and 10.4 g, which correspond respectively to 0.0%, 2.0%, and 4.0% by weight NaOH, based on the total weight of soy flour in the composite taken as 100% by weight. The NaOH was dissolved in 1000 g of distilled water followed by mixing of 265 g of soy flour (obtained from Cargill, Cedar Rapids, Iowa) with the NaOH solution until the flour was uniformly dispersed in the solution. The resulting slurry was then blended with 1500 g of ground wheat straw in order to obtain a uniform coating of the dispersion over the straw. The mixture was dried to a moisture content of 11% by weight, based upon the total weight of the mixture taken as 100% by weight. Finally, about 120 g of the dried mixture was compressively molded into 6" by 6" flat boards at a molding pressure of 333 psi and a molding temperature of 293° F. for about 5 minutes. The resultant boards were approximately 0.25" thick. Each of the test formulas had a final make-up of about 15% soybean flour, 74% wheat straw, and 11% water (all percents being by weight).

2. Quality Evaluation of Sample Boards

Mechanical property tests were conducted on the boards as set forth in Part 2(a) of Example 2. The thickness swell of the sample boards was determined following the stability test set forth in Part 2(b) of Example 2.

3. Results and Discussion

Table 9 sets forth the properties measured in this example. The data indicate that the NaOH protein modifier does not increase the physical properties of the soy/straw composite in a 3-point bend test, nor does the NaOH affect the dimensional stability of the samples. Furthermore, the composite with no NaOH modifier had a higher bending strength and was more rigid than the samples with the modifier. However, it is not believed that the NaOH modifier actually reduces the composite's strength or rigidity, since other experiments have shown the physical properties of the composites to be essentially equal with or without the NaOH modifier.

TABLE 9

Bending properties and dimensional stability of soy/straw composites with varying levels of NaOH protein modifier.

| Sample[a] | MOR (MPa) max ± 2 | MOE (MPa) max ± 400 | Thickness Swell (%) max ± 4 |
|---|---|---|---|
| 0.0% NaOH | 26.0 | 3440 | 22.1 |
| 2.0% NaOH | 23.4 | 3280 | 21.7 |
| 4.0% NaOH | 22.7 | 2580 | 20.0 |

[a]In percent by weight, based upon the total weight of the soy flour taken as 100% by weight.

We claim:

1. A molding apparatus, comprising:
   a first mold section including abase and a sidewall assembly adjacent to and extending from the base,
   said sidewall assembly having inner and outer sidewalls defining therebetween a space for receiving a molding material;
   a second mold section including a sidewall unit presenting a leading margin, one of said first or said second mold sections being a female mold section and the other of said first or second mold sections being a male mold section; and
   a mold section support assembly that supports said first and second mold sections in general alignment, and including a drive operable to selectively move at least one of said first or second mold sections so that at least a portion of said sidewall unit telescopes into said sidewall assembly to reach a molding position at least partially within said space between said inner and outer sidewalls, respective portions of said sidewall unit and at least one of the said inner and outer sidewalls cooperatively compressing said molding material during said mold section movement in order that the molding material assumes a desired shape.

2. The apparatus of claim 1, including a heating assembly operable to boat said material within said space.

3. The apparatus of claim 2, said heating assembly comprising resistance heating elements operably coupled with said inner and outer sidewalls and said sidewall unit.

4. The apparatus of claim 1, said outer sidewalk having a tapered female surface, and said sidewall unit baying a tapered male surface, said tapered surfaces portion being in general juxtaposition when said mold sections are in said molding position, with said molding material compressed between the generally juxtaposed tapered surfaces.

5. The apparatus of claim 4, said tapered female surface being adjacent said base, said tapered male surface being adjacent the leading margin of said sidewall unit.

6. The apparatus of claim 5, said tapered female surface forming a part of said outer sidewall and tapering toward the central axis of the female mold section, said tapered male surface being complementally tapered with respect to said tapered female surface.

7. The apparatus of claim 4, said tapered female and male surfaces being substantially parallel to each other when said sidewall unit is in said molding position.

8. The apparatus of claim 4, said tapered surfaces each being substantially smooth.

9. The apparatus of claim 1, said inner and outer sidewall and said sidewall unit being substantially circular in cross-section.

10. The apparatus of claim 1, said sidewall assembly being upright with said sidewall unit above the sidewall assembly.

11. The apparatus of claim 10, said male mold section including an upper wall, said sidewall unit secured to and depending from said upper wall.

12. The apparatus of claim 11, said drive operably coupled with said upper wall.

13. The apparatus of claim 12, said drive comprising a hydraulic ram.

14. The apparatus of claim 10, including a lower frame beneath and supporting said female maid section for selective movement of the finale mold section between a molding location beneath said male mold section and a load/unload location shifted away from said molding location.

15. The apparatus of claim 10, including a lower frame beneath and supporting said male mold section for selective movement of the male mold section between a molding location beneath said female mold section and a load/unload location shifted away from said molding location.

16. The apparatus of claim 10, said female mold section including an upper wall, said sidewall unit secured to and depending from said upper wall.

17. The apparatus of claim 1, said sidewall assembly having a main body with a removable liner insert received therein, said insert baying inner and outer walls which define said inner and outer sidewalls.

18. The apparatus of claim 1, said mold support assembly operable to retract said sidewall unit from said sidewall assembly alter molding of an article.

19. The apparatus of claim 18, said male mold section having a molded article detach device operable to remove said molded article from said sidewall unit upon said retraction of the sidewall unit.

20. The apparatus of claim 18, said detach device comprising a plurality of rods spaced about the periphery of said sidewall unit and shiftable in response to said retraction of the sidewall unit to engage said molded article.

21. The apparatus of claim 1, said desired shape being selected from the group consisting of circular and polygonal shapes.

22. The apparatus of claim 1, said female mold section sidewall assembly being in a shape selected from the group consisting of annular and polygonal.

23. The apparatus of claim 1, said male mold section sidewall unit being in a shape selected from the group consisting of annular and polygonal.

24. The apparatus of claim 1, said sidewall assembly of said first maid section being coupled with and extending from said base.

25. The apparatus of claim 1, said inner sidewalls having a tapered male surface, and said sidewall unit having a tapered female surface, said tapered surfaces portion being in general juxtaposition when said mold sections are in said molding position, with said molding material compressed between the generally juxtaposed tapered surfaces.

26. The apparatus of claim 25, said tapered male surface being adjacent said base, said tapered female surface being adjacent the leading margin of said sidewall unit.

27. The apparatus of claim 26, said tapered male surface forming a part of said inner sidewall and tapering toward the central axis of the male mold section, said tapered female surface being complementally tapered with respect to said tapered male surface.

28. Molding apparatus, comprising:
   a first mold section including a bottom wall and an upstanding sidewall assembly adjacent to said bottom wall,
   a second mold section including an upper wall and a depending sidewall unit secured to the upper wall, the sidewall unit having a leading margin opposite said upper wall and a tapered, mold surface;
   said sidewall assembly of said first mold section including inner and outer sidewalls, defining therebetween a space for receiving a molding material, one of the inner and outer sidewalls having a tapered mold surface;
   a support assembly that supports one of said first or second mold sections above the other of said first or second mold sections and in general alignment therewith;
   a drive for selectively moving the male sidewall unit into said space between said inner and outer sidewall of the first mold section until said tapered mold surface of said first mold section comes into a molding position in general side-by-side proximity with said tapered mold surface of said second mold section, thereby compressing said molding material therebetween; and
   a heating assembly operable to beat said material when the material is compressed between said tapered surfaces.

29. The apparatus of claim 28, said first mold section being the male mold section and said second mold section being the female mold section.

30. The apparatus of claim 28, said tapered mold surface of said first mold section being complementally tapered with said tapered mold surface of said second mold section.

31. The apparatus of claim 30, said tapered surface of said fist mold section and tapered surface of said second mold section each presenting substantially smooth facing wall surfaces.

32. The apparatus of claim 28, said heating assembly comprising resistance hearing elements operably coupled with said inner and outer sidewalls and said sidewall unit.

33. The apparatus of claim 28, said tapered mold surface of said first mold section being adjacent said base, said tapered surface of said second mold section being adjacent the leading margin of said sidewall unit.

34. The apparatus of claim 28, said tapered mold surface of said first mold section being a tapered female surface and forming a part of said outer sidewall and tapering toward the central axis of the female mold section, said tapered female surface being complementally tapered with respect to said tapered surface of said second mold section.

35. The apparatus at claim 28, said tapered surface of said first mold section being female and said tapered surface of said second mold section being male, said tapered surfaces being substantially parallel to each other when said sidewall unit is in said molding position.

36. The apparatus of claim 28, said inner and outer sidewall and said sidewall unit being substantially circular in cross-section.

37. The apparatus of claim 28, said drive comprising a hydraulic ram.

38. The apparatus of claim 28, said sidewall assembly having a main body with a removable liner insert received therein, said insert having inner and outer walls which define said inner and outer sidewalls.

39. The apparatus of claim 28, said mold support assembly operable to retract said sidewall unit from said sidewall assembly after molding of an article.

40. The apparatus of claim 39, said male mold section having a molded article detach device operable to remove said molded article from said sidewall unit upon said retraction of the sidewall unit.

41. The apparatus of claim 40, said detach device comprising a plurality of rods spaced about the periphery of said sidewall unit and shiftable in response to said retraction of the sidewall unit to engage said molded article.

42. The apparatus of claim 28, said female mold section sidewall assembly being in a shape selected from the group consisting of annular and polygonal.

43. The apparatus of claim 28, said male mold section sidewall unit being in a shape selected from the group consisting of annular and polygonal.

44. The apparatus of claim 28, said sidewall assembly of said first mold section being coupled with and extending from said base.

45. The apparatus of claim 28, said first mold section being the female mold section and said second mold section being the male mold section.

46. The apparatus of claim 28, said tapered mold surface of said first mold section being a tapered male surface and forming a part of said inner sidewall and tapering toward the central axis of the male mold section, said tapered male surface being complementally tapered with respect to said tapered surface of said second mold section.

47. The apparatus of claim 28, said tapered surface of said first mold section being male and said tapered surface of said second mold section being female, said tapered surfaces being substantially parallel to each other when said sidewall unit is in said molding position.

* * * * *